United States Patent
Kraatz

(10) Patent No.: US 8,764,336 B2
(45) Date of Patent: Jul. 1, 2014

(54) SERVICEABLE SPHERICAL JOINTS WITH WEAR-COMPENSATION FEATURES

(76) Inventor: Clayton Kraatz, Irricana (CA)

( * ) Notice: Subject to any disclaimer, the term of this patent is extended or adjusted under 35 U.S.C. 154(b) by 0 days.

(21) Appl. No.: 13/558,831

(22) Filed: Jul. 26, 2012

(65) Prior Publication Data

US 2013/0189020 A1  Jul. 25, 2013

Related U.S. Application Data

(63) Continuation-in-part of application No. 13/288,196, filed on Nov. 3, 2011.

(51) Int. Cl.
*F16C 11/06* (2006.01)
(52) U.S. Cl.
USPC .......................................... 403/137; 403/143
(58) Field of Classification Search
USPC ........... 403/76, 122, 135, 137, 141, 142, 143;
180/258; 285/145.3, 261, 271, 384;
280/93.511, 86.756, 137.503, 503, 511
See application file for complete search history.

(56) References Cited

U.S. PATENT DOCUMENTS

| | | | | |
|---|---|---|---|---|
| 807,857 A | * | 12/1905 | Palmenberg | 403/148 |
| 3,086,801 A | * | 4/1963 | Herbenar | 403/141 |
| 4,187,033 A | * | 2/1980 | Zukowski | 403/137 |
| 4,203,683 A | * | 5/1980 | Rogers | 403/135 |
| 2011/0097140 A1 | * | 4/2011 | Yu et al. | 403/137 |

FOREIGN PATENT DOCUMENTS

DE     2527026 A1 * 12/1976

* cited by examiner

*Primary Examiner* — Michael P Ferguson
*Assistant Examiner* — Matthieu Setliff
(74) *Attorney, Agent, or Firm* — Kyle R. Satlerthwaite; Ryan W. Dupius; Ade & Company Inc.

(57) ABSTRACT

A spherical joint features a housing, a lower race seated therein, a ball member disposed between said lower race and an upper race position, and a retaining ring installed directly over the upper race in an annular groove inside the housing. In one embodiment, a retaining member is threaded into the housing over the retaining ring. The joint is fully serviceable by removal of the retaining member and ring. Prior to component replacement, initial wear can be compensated for, as the groove is oversized so as to originally lie partially below the ring-abutted upper surface of the upper race. When the upper race moves down the body as a result of surface wear of one or more of the races and ball member, tightening of the retaining member once again forces the retaining ring down against the upper race to re-tighten the races against the ball member disposed therebetween.

14 Claims, 5 Drawing Sheets

SERVICEABLE SPHERICAL JOINTS WITH WEAR-COMPENSATION FEATURES

CROSS REFERENCE TO RELATED APPLICATIONS

This application is a continuation-in-part of Non-Provisional patent application Ser. No. 13/288,196, filed Nov. 3, 2011.

FIELD OF THE INVENTION

The present invention relates to spherical joints such as ball joints, rod ends and tie rod ends, and more particularly to joints of this type that can be dismantled for service and re-tightened to compensate for initial levels component wear before requiring component replacement.

BACKGROUND OF THE INVENTION

Conventional tie rod ends are manufactured in a manner that prevents access to interior components for service of the tie rod ends when significantly worn after extended use. In such a conventional structure, the housing of the unit has an open bottom end of reduced diameter presenting an inward projecting lip or flange against which the lower race is seated around the opening through which the stem or stud of the ball member projects. The ball portion of the ball member is received between the lower race and a corresponding upper race, which together provide spherically contoured surfaces conforming against the ball at positions thereover and thereunder so that the ball can rotate in any of three orthogonal axes to allow rotation of the stem and tilting thereof in any direction. In this conventional structure, the top end of the housing is permanently closed off, for example by pressing a cap into the body over a crush-washer surmounting the upper race to crush the washer to a level providing a desired degree of tightness of the upper race against the ball, and then crushing a retaining lip into position over the perimeter of the closed cap. The housing is thus permanently closed at both ends, preventing access to the internal components. Accordingly, the internal components cannot be replaced when worn, and so the entire assembly must be replaced with a new joint, as the internal components cannot be accessed, at least not in a manner that is non-destructive to the housing to allow re-use thereof.

Some serviceable designs for tie rod ends and ball joints have been proposed.

U.S. Pat. No. 6,908,251 teaches tie rod ends and ball joints where an externally threaded retainer member is engaged into the housing from the upper end thereof to close the housing and tighten the upper race against the ball member. The threaded engagement of this retainer member to the housing allows removal for access to the internal components. However, there is some concern that even with use of a set screw to secure the retainer member in place, the threaded coupling may come loose during use of the tie rod end or ball joint.

U.S. Patent Application Publication No. 2009/0238636 teaches tie rod ends and ball joints that likewise use a threaded retainer member, but additionally add a retaining ring and snap ring engaged to the housing overtop of the threaded retainer member. While the design does allow access to internal components for service, and prevents backing off of the threaded retainer member by way of the added rings, there still remains room for improvement.

Applicant of the present application has developed novel spherical joints useful to provide reliable and serviceable rod ends, tie rod ends and ball joints.

SUMMARY OF THE INVENTION

According to a first aspect of the invention there is provided a spherical joint comprising:

a housing comprising a housing body having a hollow interior extending thereinto along a housing axis from an upper end of said housing body toward an opposing lower end of said housing body;

a ball member sized to fit within the hollow interior of the housing body and defining a spherically contoured concave outer surface extending around a ball axis of said ball member;

a lower race sized to seat within the hollow interior of the housing body adjacent the lower end thereof and having a spherically contoured upward facing concave surface for conforming receipt of the concave outer periphery of the ball member therein to seat the ball member atop the lower race in a manner allowing tilting of the ball axis and rotation of the ball member thereabout;

an upper race sized to fit within the hollow interior of the housing body over the ball member and having a spherically contoured downward facing concave surface for surmounting the ball member when tiltably and rotatably seated on the lower race;

an annular groove in a peripheral wall of the hollow interior of the housing body at a position that is adjacent to an upper portion of the upper race when said upper race is surmounted on the ball member; and a retaining ring sized to be engaged in the annular groove around the boundary wall of the hollow interior of the housing body to reside between the upper race and the upper end of the housing body in a position directly adjacent the upper portion of the upper race.

Preferably the housing body comprises an integrally defined lower seat arranged for seating of the lower race thereagainst after insertion of the lower race into the hollow interior of the housing body through the upper end thereof.

Preferably the lower seat is an annular seat closing around a bottom opening of the hollow interior of the housing body at the lower rend thereof.

In one embodiment, there is provided internal threading on the housing body adjacent the upper end thereof, and an externally threaded retaining member arranged to threadingly engage the internal threading of the housing body and dimensioned to abut against the retaining ring under sufficient threaded advancement into the hollow interior of the housing body.

Preferably a thickness of the groove in the peripheral wall of the hollow interior of the housing body exceeds a thickness of the retaining ring, an upper wall of the groove is positioned to lie between a top end of an outer periphery of the upper race and the upper end of the housing body and a lower wall of the groove is positioned to lie between the top end of the outer periphery of the upper race and the lower end of the housing body when the upper and lower races and the ball member are initially installed in the housing body, whereby tightening of the spherical joint after use thereof can be effected to compensate for wear of one or more of the races and the ball member by further advancing the retaining member into the hollow interior of the housing body to once again force the retaining ring against the top end of the outer periphery of the upper race to tighten the races around the ball member.

Preferably there is provided a set screw to lock the retaining member in place, wherein the housing comprises a threaded bore extending through a wall of the housing body into the hollow interior thereof at a location along the housing axis between the upper end of the housing body and the annular groove in the peripheral wall of the hollow interior of said housing body for threaded receipt of the set screw. Preferably the set screw tapers toward a working end thereof opposite a tool-engagable head of the set screw to minimize thread damage by engaging against the retaining member between external threads thereof.

The retaining ring may be a snap ring, or alternatively may be a spiral lock ring.

The ball member may be through-bored along the ball axis thereof, whereby the spherical joint is a rod end joint, in which case the retaining member is preferably annular in shape to provide an opening through which the through-bored ball member is accessible. Alternatively, the ball member may comprise an integral stud projecting from a frustospherical portion of the ball member along the central axis thereof, whereby the spherical joint is a ball joint or tie rod end, in which case the retaining member is preferably a cap arranged to close off the upper end of the housing body.

The housing may comprise a stem projecting from the housing body in a radial direction relative to the housing axis.

Preferably there is provided a grease port in the housing or the retaining member for grease delivery into the hollow interior of the housing body.

In another embodiment lacking the retaining member, the retaining ring defines a sole retaining feature that alone prevents separation of the upper race from the housing body.

Preferably the upper race and the ball member comprise bodies of a same material.

Preferably the bodies of the same material have different surface hardness properties.

Preferably the ball member has a greater surface hardness than the upper race.

Preferably the upper race and ball member both comprise steel.

Preferably the steel is an alloy steel.

Preferably the alloy steel is 4140 steel.

Preferably the lower race is of the same material as the upper race and the ball member.

According to a second aspect of the invention there is provided a spherical joint comprising:

a housing comprising a housing body having a hollow interior extending thereinto along a housing axis from an upper end of said housing body toward an opposing lower end of said housing body;

a ball member disposed within the hollow interior of the housing body and defining a spherically contoured concave outer surface extending around a ball axis of said ball member;

a lower race seated within the hollow interior of the housing body adjacent the lower end thereof and having a spherically contoured upward facing concave surface conformingly receiving the concave outer periphery of the ball member therein to seat the ball member atop the lower race in a manner allowing tilting of the ball axis and rotation of the ball member thereabout;

an upper race disposed within the hollow interior of the housing body over the ball member and having a spherically contoured downward facing concave surface conformingly surmounting the ball member;

an annular groove in a peripheral wall of the hollow interior at a position along the housing axis adjacent an upper portion of the upper race between the upper and lower ends of the housing body; and a retaining ring engaged in the annular groove around the boundary wall of the hollow interior of the housing body directly adjacent the upper portion of the upper race.

In one embodiment there is provided internal threading on the housing body between the annular groove and the upper end of the housing body, and an externally threaded retaining member threadingly engaged with the internal threading of the housing body and abutting against the retaining ring.

The retaining ring may initially occupy an upper portion of the annular groove disposed above a top end of an outer periphery of the upper race, leaving a lower portion of the annular groove unoccupied below the top end of the outer periphery of the upper race, whereby tightening of the spherical joint after use thereof can be effected to compensate for wear of one or more of the races and the ball member by further advancing the retaining member into the hollow interior of the housing body to force the retaining ring against the top end of the outer periphery of the upper race at the lower portion.

According to a third aspect of the invention there is provided a method of forming a spherical joint by:

obtaining a housing body having a hollow interior extending thereinto along a housing axis from an upper end of said housing body toward an opposing lower end of said housing body, and an annular groove found in a boundary wall of the hollow interior of the housing body at a location between the upper and lower ends of the housing body;

seating a lower race within the hollow interior of the housing body adjacent the lower end thereof;

placing a ball member atop the lower race in a manner allowing tilting of the ball axis and rotation of the ball member thereabout;

placing an upper race atop the ball member;

engaging a retaining ring in the annular groove found around the boundary wall of the hollow interior of the housing body to place the retaining ring directly adjacent an upper portion of the upper race.

In one embodiment, the housing body comprises internal threading adjacent the upper end thereof, and the method further comprises the step of threading an externally threaded retaining member into the hollow interior of the housing body to abut the retaining member against the retaining ring from a side thereof opposite the upper race to force the retaining ring against the upper race.

According to a fourth aspect of the invention there is provided a method of tightening a spherical joint having a housing body, a lower race seated adjacent a lower end of said housing body, a ball member disposed in the housing body between said lower race and an upper race position over said ball member, a retaining ring installed over the upper race in an annular groove inside the housing body, and a retaining member threaded into the housing body over the retaining ring, the method comprising compensating for wear of one or more of the upper and lower races and the ball member during use of the spherical joint by threadingly advancing the retaining member further into the housing body to force the retaining ring against the upper race in a lower portion of the annular groove originally unoccupied by the retaining ring before said wear occurred.

According to a fifth aspect of the invention there is provided spherical joint comprising:

a housing comprising a housing body having a hollow interior extending thereinto along a housing axis from an upper end of said housing body toward an opposing lower end of said housing body, said housing body comprising internal threading adjacent said upper end and comprising an annular groove in a peripheral wall of the hollow interior at a position along the housing axis between the internal threading of the lower end of the housing body;

a ball member sized to fit within the hollow interior of the housing body and defining a spherically contoured concave outer surface extending around a ball axis of said ball member;

a lower race sized to seat within the hollow interior of the housing body adjacent the lower end thereof and having a spherically contoured upward facing concave surface for conforming receipt of the concave outer periphery of the ball member therein to seat the ball member atop the lower race in a manner allowing tilting of the ball axis and rotation of the ball member thereabout;

an upper race sized to fit within the hollow interior of the housing body over the ball member and having a spherically contoured downward facing concave surface for surmounting the ball member when tiltably and rotatably seated on the lower race;

a retaining ring sized to be engaged in the annular groove around the boundary wall of the hollow interior of the housing body to reside between the upper race and the upper end of the housing body; and an externally threaded retaining member arranged to threadingly engage the internal threading of the housing body and dimensioned to abut against the retaining ring under sufficient threaded advancement into the hollow interior of the housing body.

According to a sixth aspect of the invention there is provided spherical joint comprising:

a housing comprising a housing body having a hollow interior extending thereinto along a housing axis from an upper end of said housing body toward an opposing lower end of said housing body, said housing body comprising internal threading adjacent said upper end and comprising an annular groove in a peripheral wall of the hollow interior at a position along the housing axis between the internal threading of the lower end of the housing body;

a ball member disposed within the hollow interior of the housing body and defining a spherically contoured concave outer surface extending around a ball axis of said ball member;

a lower race seated within the hollow interior of the housing body adjacent the lower end thereof and having a spherically contoured upward facing concave surface conformingly receiving the concave outer periphery of the ball member therein to seat the ball member atop the lower race in a manner allowing tilting of the ball axis and rotation of the ball member thereabout;

an upper race disposed within the hollow interior of the housing body over the ball member and having a spherically contoured downward facing concave surface conformingly surmounting the ball member;

a retaining ring engaged in the annular groove around the boundary wall of the hollow interior of the housing body and residing between the upper race and the upper end of the housing body; and an externally threaded retaining member threadingly engaged with the internal threading of the housing body and abutting against the retaining ring.

According to a seventh aspect of the invention there is provided a method of retaining a ball member of a spherical joint within a housing thereof, the method comprising assembling the spherical joint by:

obtaining a housing body having a hollow interior extending thereinto along a housing axis from an upper end of said housing body toward an opposing lower end of said housing body, internal threading adjacent said upper end of the housing body, and an annular groove found in a boundary wall of the hollow interior of the housing body at a location between the internal threading and the lower end of the housing body;

seating a lower race within the hollow interior of the housing body adjacent the lower end thereof;

placing a ball member atop the lower race in a manner allowing tilting of the ball axis and rotation of the ball member thereabout;

placing an upper race atop the ball member;

engaging a retaining ring in the annular groove found around the boundary wall of the hollow interior of the housing body; and threading an externally threaded retaining member into the hollow interior of the housing body to abut the retaining member against the retaining ring from a side thereof opposite the upper race to force the retaining ring against the upper race.

According to another aspect of the invention there is provided a spherical automotive joint comprising:

a housing comprising a housing body having a hollow interior extending thereinto along a housing axis from an open upper end of said housing body toward an opposing lower end of said housing body;

a ball member sized to fit within the hollow interior of the housing body and defining a spherically contoured concave outer surface extending around a ball axis of said ball member;

a lower race sized to seat within the hollow interior of the housing body adjacent the lower end thereof and having a spherically contoured upward facing concave surface for conforming receipt of the concave outer periphery of the ball member therein to seat the ball member atop the lower race in a manner allowing tilting of the ball axis and rotation of the ball member thereabout;

a steel upper race sized to fit within the hollow interior of the housing body over the ball member and having a spherically contoured downward facing concave surface for surmounting the ball member when tiltably and rotatably seated on the lower race;

an annular groove in a peripheral wall of the hollow interior of the housing body at a position that is adjacent to an upper portion of the upper race when said upper race is surmounted on the ball member, an inner diameter of the housing being greater at said annular groove than at a non-grooved portion of the hollow interior between the annular groove and the open upper end of the housing; and a retaining ring engaged in the annular groove around the boundary wall of the hollow interior of the housing body in a position residing between upper and lower walls of the annular groove and exposed to direct contact with both the upper portion of the upper race and the upper wall of the annular groove, which is located between the retaining ring and the open upper end of the housing and blocks movement of the retaining ring toward the open upper end of the housing;

wherein the interior space of the housing is free of any other components between the annular groove and the upper end of the housing such that the retaining ring and the annular groove alone define an only mechanism of the spherical automotive joint for blocking movement of the upper race toward and through the upper end of the housing.

According to yet another aspect of the invention there is provided a method of forming a spherical automotive joint, the method comprising:

obtaining a housing body having a hollow interior extending thereinto along a housing axis from an open upper end of said housing body toward an opposing lower end of said housing body, and an annular groove found in a boundary wall of the hollow interior of the housing body at a location between the upper and lower ends of the housing body;

seating a lower race within the hollow interior of the housing body adjacent the lower end thereof;

placing a ball member atop the lower race in a manner allowing tilting of the ball axis and rotation of the ball member thereabout;

placing a steel upper race atop the ball member;

engaging a retaining ring in the annular groove found around the boundary wall of the hollow interior of the housing body to place the retaining ring directly adjacent an upper portion of the upper race in a position residing between upper and lower walls of the annular groove and exposed to direct contact with both the upper portion of the upper race and the upper wall of the annular groove, which that is located between the retaining ring and the open upper end of the housing and blocks movement of the retaining ring toward the open upper end of the housing; and leaving the hollow interior of the housing free of any other components between the annular groove and the open upper end of the housing such that retaining ring and the annular groove alone define an only mechanism of the spherical automotive joint for blocking movement of the upper race toward and through the open upper end of the housing.

BRIEF DESCRIPTION OF THE DRAWINGS

In the accompanying drawings, which illustrate exemplary embodiments of the present invention.

DETAILED DESCRIPTION

Figure 1A:
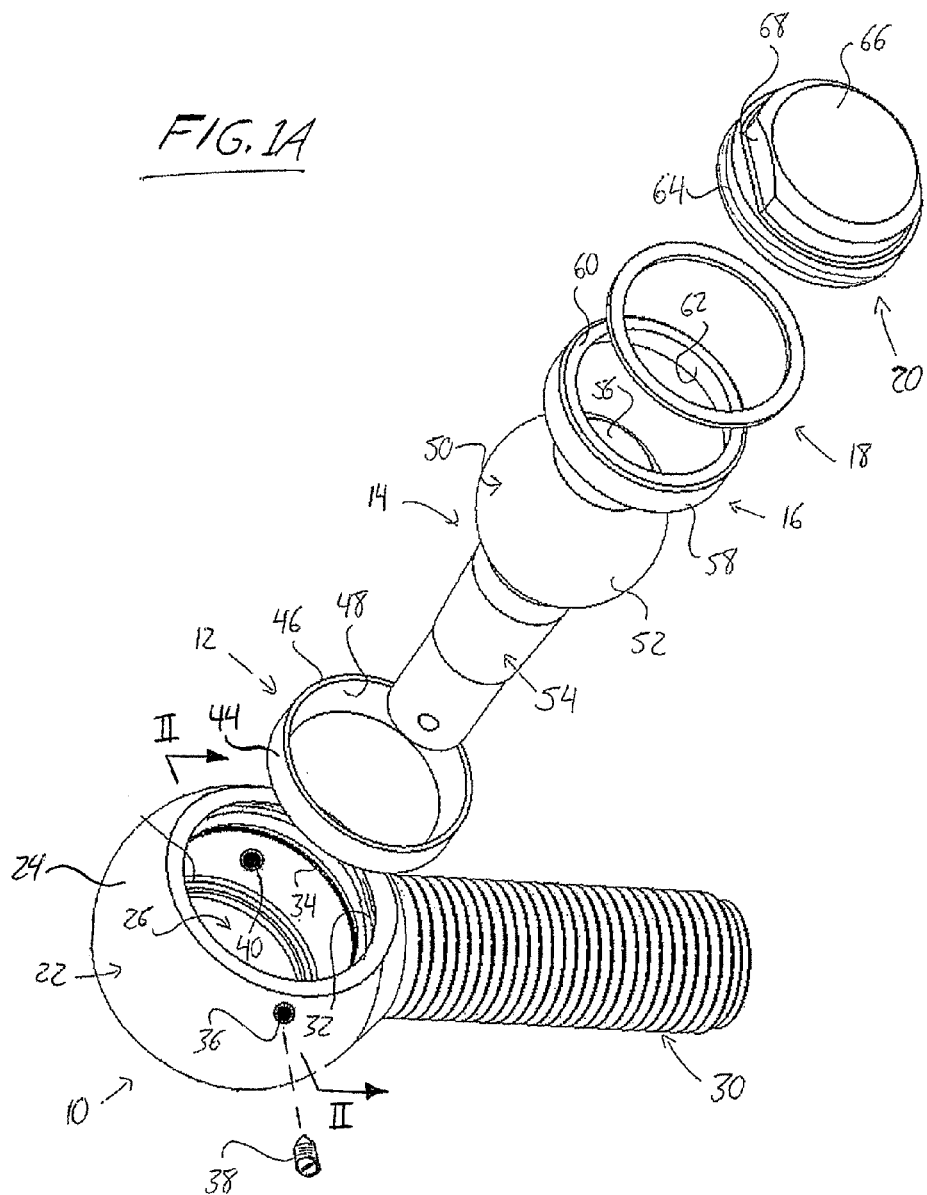
FIG. 1 is an exploded view of a tie rod end or rod end according to a first embodiment of the present invention, which can be dismantled for service and re-tightened to compensate for wear of components during use.
Figure 1B:
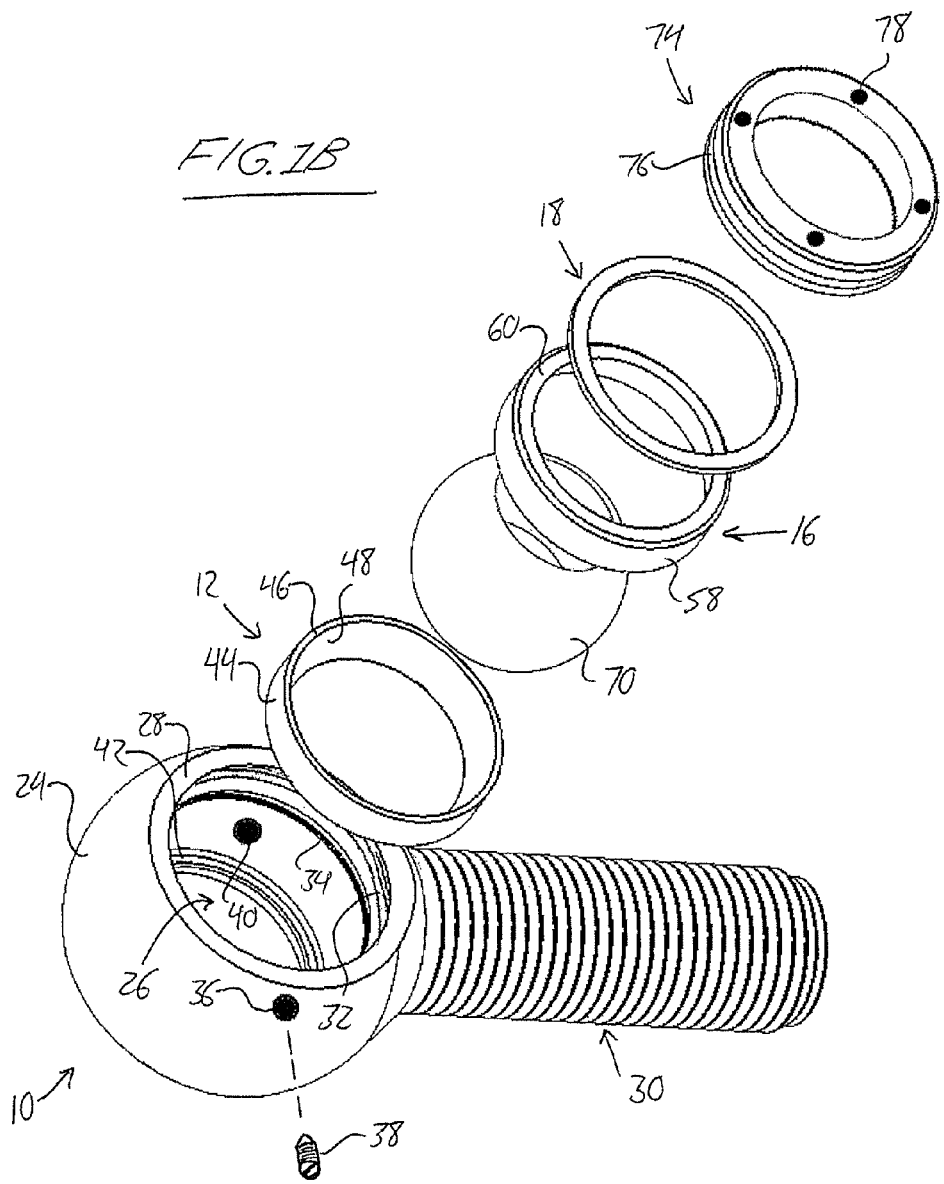

FIG. 1 illustrates the components of a tie rod end assembled from a housing 10, a lower race 12, a ball member 14, an upper race 16, a retainer ring 18, and a retainer cap 20.

The housing features a housing body 22 having a frustospherical exterior surface 24 extending concentrically around the axis of a cylindrical through-bore 26 extending through the body 22 from an upper planar end face 28 thereof to an opposing and parallel lower planar end face. The housing additionally features an externally threaded stem 30 projecting linearly outward therefrom in a radial direction relative to the through-bore axis of the body 22. The body 22 is internally threaded to define internal threads 32 on the cylindrical peripheral wall of the through-bore 26 that extend over a partial portion of the bore's axial length from the upper end 28 thereof. At a location slightly further into the body 22 past the inner end of the threaded portion 32 from the upper end 28 of the body 22 is an annular groove 34 recessed into the cylindrical peripheral wall of the through bore 26. A threaded bore 36 extends radially through the wall of the body 22 from the exterior surface 24 into the through-bore 26 on one side thereof at the threaded portion 32 thereof for receipt of a set-screw 38 of corresponding external thread. Further into the body 22 from the upper end 28 thereof past the annular groove 34, a grease port 40 likewise extends radially through the circumferential wall of the body 22 from the exterior surface 24 thereof into the through-bore 26 from one side thereof. Adjacent the lower end of the body, an inwardly directed annular flange or lip 42 projects partially into the through-bore 26 so that the opening at the lower end of the body is reduced compared to the opening at the upper end. This inner face 42 presents an annular shoulder or ledge inside the through-bore near the bottom end thereof.

The lower race 12 is of a conventional shape, with an annular form presenting a cylindrical outer surface 44 and flat parallel end faces, the upper one of which is visible at 46. A contoured inner surface 48 of the race 12 is frustospherical and faces concavely inward and upward toward the upper end 46 of the piece. The outer diameter of the lower race is equal or slightly less than the diameter of the housing's through-bore 26 so as to fit into the through-bore 26 through the open upper end 28 of the housing, and be movable axially along the through-bore 26 to seat or land the flat bottom of the race 12 flush against the annular flange 42 near the bottom end of the housing.

In a conventional manner, the ball member 14 comprises a solid ball portion 50 having a frustospherical exterior 52 and a stud, stem or shaft portion 54 projecting integrally and concentrically from the lower end the ball portion 50 opposite the illustrated planar upper end 56 thereof. The annular form of the lower race 12 allows the stud 54 of the ball member 14 to project through the lower race and onward through the open lower end of the housing when the portion of the ball's frustospherical exterior 52 surrounding the stud 54 is seated on the conformingly frustospherical inner surface of the lower race 12.

The upper race 16 is also of a conventional shape, with an annular form presenting a cylindrical outer surface 58 and flat parallel end faces, the upper one of which is visible at 60. A contoured inner surface 62 of the race 16 is frustospherical and faces concavely inward and downward toward the lower end of the piece. The outer diameter of the upper race is equal or slightly less than the diameter of the housing's through-bore 26 so as fit into the through-bore 26 through the open upper end 28 of the housing, and be movably axially along the through-bore 26 to surmount the ball portion 50 of the ball member 14 in a manner positioning the frustospherical inner surface 62 of the race 16 conformingly over the portion of the ball's frustospherical exterior 52 surrounding the upper end 56 thereof.

In a conventional manner, this seating of the convexly spherical surface of the ball against the conforming concavely spherical surfaces of the races allows the ball member 14 to pivot or rotate about its central longitudinal axis and tilt this axis in any direction while the ball member is seated between the races. In other words, the ball member is able to pivot about any of three orthogonal axes.

The retainer ring 18, schematically shown without detail in the accompanying figures, is a spiral lock ring or snap ring whose default outer diameter exceeds the bore-diameter of the housing body 22 so that gripping the ring 18 in a reduced diameter state and inserting the ring into the through-bore 26 of the housing to the position the ring at the axial position of the annular groove along the through-bore will act to expand the ring 18 back toward to its default state when released, thereby expanding the ring partially into the recess 34 while leaving an inner portion of the ring outside the recess, i.e. within the through bore 26, to project toward the axis of the housing through-bore 26.

The retainer cap 20 comprises an externally threaded cylindrical body 64 on which the external threads are configured for mating engagement with the internal threads 32 of the housing to close off the through-bore opening at the upper end 28 of the housing body 22. Atop the externally threaded cylindrical body 22 is disposed a head portion 66 presenting a pair of opposing wrench flats, one of which is visible at 68, for engagement by a wrench to drive rotation of the threaded cylindrical portion 64 about its central axis.

The tie rod end is assembled by first inserting the lower race 12 into the through-bore of the housing body 22 through the open upper end thereof and seating the flat underside of the lower race 12 against the lower flange 42. The ball member 14 is then inserted stud-first into the through-bore 26 of the housing body 22 through the open upper end thereof, passing the stud 54 through the lower race and open lower end of the housing body 22 to seat the ball portion 50 on the lower race. The upper race 12 is then inserted into the through-bore of the housing body 22 through the open upper end to seating concave inner surface of the upper race on the ball portion of the ball member. The annular groove 34 inside the housing body 22 has a thickness exceeding that which is necessary to allow receipt of the retainer ring 18 therein and is positioned so that this thickness of the groove 34 spans across the axial position of the through bore occupied by the flat upper end 60 of the upper race when the two races and ball member are initially installed in new condition, as shown in the assembled cross-sectional view of FIG. 2. That is, an upper portion of the groove 34, having sufficient thickness to receive the ring, lies above the upper race, and a remaining lower portion of the groove lies below the upper end 60 of the upper race 12.

With the upper race installed, the retaining ring 18 is thus engaged into the upper portion of the groove 34 so that the inner portion of the retaining ring 18 jutting into the through-bore of the housing from the groove 34 lies over the upper end 60 of the upper race 16. Contact of the upper face of the retaining ring 18 against the upper wall of the groove 34 thus blocks movement of the retaining ring 18, and thus the race and ball components therebelow, toward the upper end of the housing body 22.

The retaining cap 20 is then threaded into the upper end of the housing through-bore 26 to close this end of the housing body and abut the flat bottom end of the cap's cylindrical portion 64 against the top face of the retainer ring 18. The retaining cap 20 is advanced in this threaded engagement by an amount sufficient to force the retaininer ring 18 downward against the upper race to achieve a suitable 'tightness' of the ball member between the two races. With the retaining cap 20 advanced to this suitable position, this position is then secured by tightening of the set screw 38 to abut the pointed inner working end thereof radially against the exterior of the cap 20, thereby completing the assembly of the tie rod end.

Figure 2:
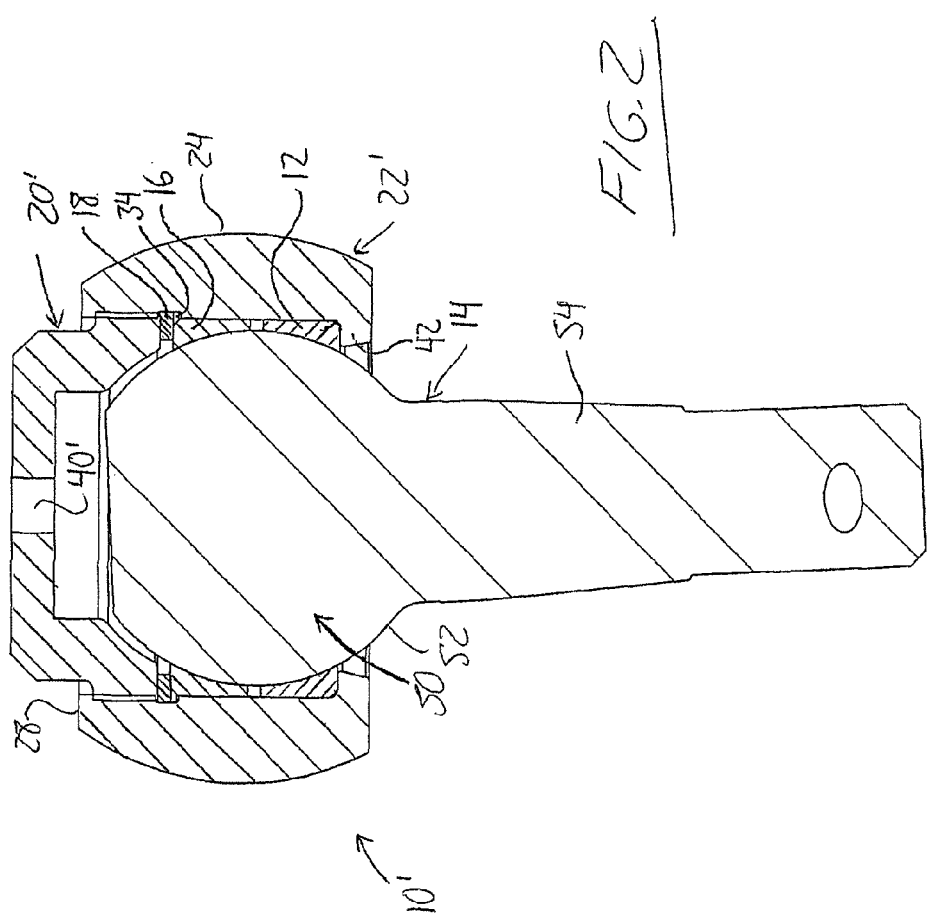
FIG. 2 is an assembled cross-sectional view of a tie rod end similar to that of FIG. 1, but with a grease port extending axially through a removable cap member of the tie rod end rather than radially through the wall of a housing thereof.

FIG. 2 shows a tie rod end like that of FIG. 1 once fully assembled with new components in the manner described above prior to any use and associated wear of the device. This FIG. 2 variation of the FIG. 1 tie rod end also illustrates the use of a grease port 40' extending axially through the cap 20' as an alternative to the FIG. 1 grease port 40 extending radially through the housing wall.

After a tie rod has been used for some time, it will come loose to some degree as the spherically contoured surfaces of one or more of the races and the ball wear away as a result of the relative movement therebetween during use of the tie rod end. With the above design, the excess thickness of the housing groove makes it possible to re-tighten the tie rod end to compensate for this wear. As the working surfaces wear away, a gap is created somewhere between the lower end of the cap 20 and the fixed-position lower flange 42 of the housing 22, whereas all the components therebetween were initially abutted in close contact when the tie rod end was first assembled. The tie rod end can be retightened by loosening the set screw 38 out of engagement with the cap 20, and advancing the cap 20 further into the interior bore 26 of the hollow housing body 22 against the retainer ring 18, which in turn is again forced against the upper race 16, but at a lower position in the ring-receiving groove 34 than when the original unworn internal components were initially installed. This tightening of the cap against the ring and upper race in turn once again clamps the ball member down more firmly on the lower race, thereby re-tightening the joint. The cap is once again locked in place by the set screw 38, thereby returning the tie rod end to a fully assembled ready-to-use state.

Once one or more of the components has been worn away to a degree that cannot be compensated by further tightening of the cap, the removability of the components allows for service of the tie rod end by replacement of one or more internal components, particularly those whose surfaces tend to wear away under movement of the ball member relative to the races. That is, loosening of the set screw and removal of the cap and retaining ring provides accessibility to the races and ball member for removal thereof, and inspection and replacement as required. The grease port 40 also allows the races and ball member to be periodically lubricated to minimize wear and extend the pre-service life of the unit. As an alternative to a grease port on the housing, a grease port extending axially through the cap 20 may alternatively be employed.

FIG. 1 also shows how similar use of a cap-over-ring retention arrangement can be used in spherical joints other than a tie rod end. For example, by substituting a stud-less ball 70 that is hollowed out by a cylindrical through-bore 72 for the studded solid ball member 14, the spherical joint defines a Heim style rod end. To avoid features projecting outward beyond the upper end face 28 of the housing body 22, an alternate style of retainer member 74 may be employed in place of the cap described above, where the flats 68 must used to tighten and loosen the cap must remain outside the housing for access by a suitable wrench. The second retainer member 74 features no circumferential flats, instead having a purely cylindrical form with the external threading 76 around its outer periphery and having axial holes 78 arranged in diametrically opposed pairs just inside the piece's outer periphery in an upper one of the piece's flat end faces for receiving the driving pins of a spanner wrench. The driving pins of the tool can thus extend inwardly past the upper end of the housing body to engage into the axial holes of the retainer member 74. As shown for a Heim-style joint, the retainer member 74 is annular or ring-shaped so as to leave a central hole 80 opening through the cap to communicate with the through-bore 72 of the ball 70.

In addition to the above described tie rod end and Heim style joint, the same cap-over-ring retention arrangement can be used to form a tightenable and serviceable ball joint, or other ball-and-socket type joint. Accordingly, the ball member may or may not have a stud, and the housing may likewise may or may not have a stem, threaded or otherwise, according to the particulars of an application for which the assembled spherical joint is intended. That is, the invention extends to Tie Rod Ends, Rod Ends, Ball Joints or Ball Sockets comprising of any of the above housings, using any combination of balls with through holes or balls with elongated stems, threaded or not.

In summary, the balls are captured in the housings between two races on top of a land or seat which is integral to the housing. The races are retained in the housing by a snap ring or spiral lock that holds tension on the races. The snap ring groove is cut with excess clearance into the housing. With the snap ring or spiral lock inserted into the groove, it holds the two races with minimal tension on the ball. The threaded locking cap or ring then backs the snap ring or spiral lock and a preferably pointed set screw is then set into the side of the locking ring, preventing the snap ring/spiral lock from failing under pressure. This increases the snap ring's working load. At the same time as components wear and tolerances grow, the lock ring/cap can be tightened up, pushing the snap/spiral ring further into its groove and allowing the component to be tightened to the desired tension without disassembly. The forgoing embodiment thus provides a tightening functionality not found in the prior art, whereby the joint can be tightened to compensate for an initial amount of wear to the internal components.

The snap ring being placed under the lock ring/cap acts as a thrust washer, preventing the threaded locking cup or ring from being backed off through friction caused by the ball turning on the race which, as a result, would otherwise act to turn the cap. It also prevents the lock ring from being pushed out of the housing and it prevents the races from becoming excessively loose. All of these benefits are gained making it a longer lasting, safer product with the added plus of being able to preload the components without any disassembly.

While the orientation of the device shown in FIG. 1 corresponds to the 'upper' and 'lower' terminology used in the above description, it will be appreciated that these terms are being used to define positions of components and features relative to one another and the order of installation components, i.e. lower components placed in the housing prior to upper components that then lie 'atop' or 'over' the lower components. On this basis, it should be understood that these terms are not used to denote a particular orientation in which the overall apparatus is intended to be used or installed, and so an apparatus that would read on the present invention if re-oriented to correlate its components and features with the 'upper' and 'lower' components recited herein would read on the present invention even if the installed or in-use position and orientation of the apparatus does not correlate with the 'upper' and 'lower' or 'top' and 'bottom' language used to distinguish the races from one another and describe relative positioning the various components and features of the present invention.

Figure 3:
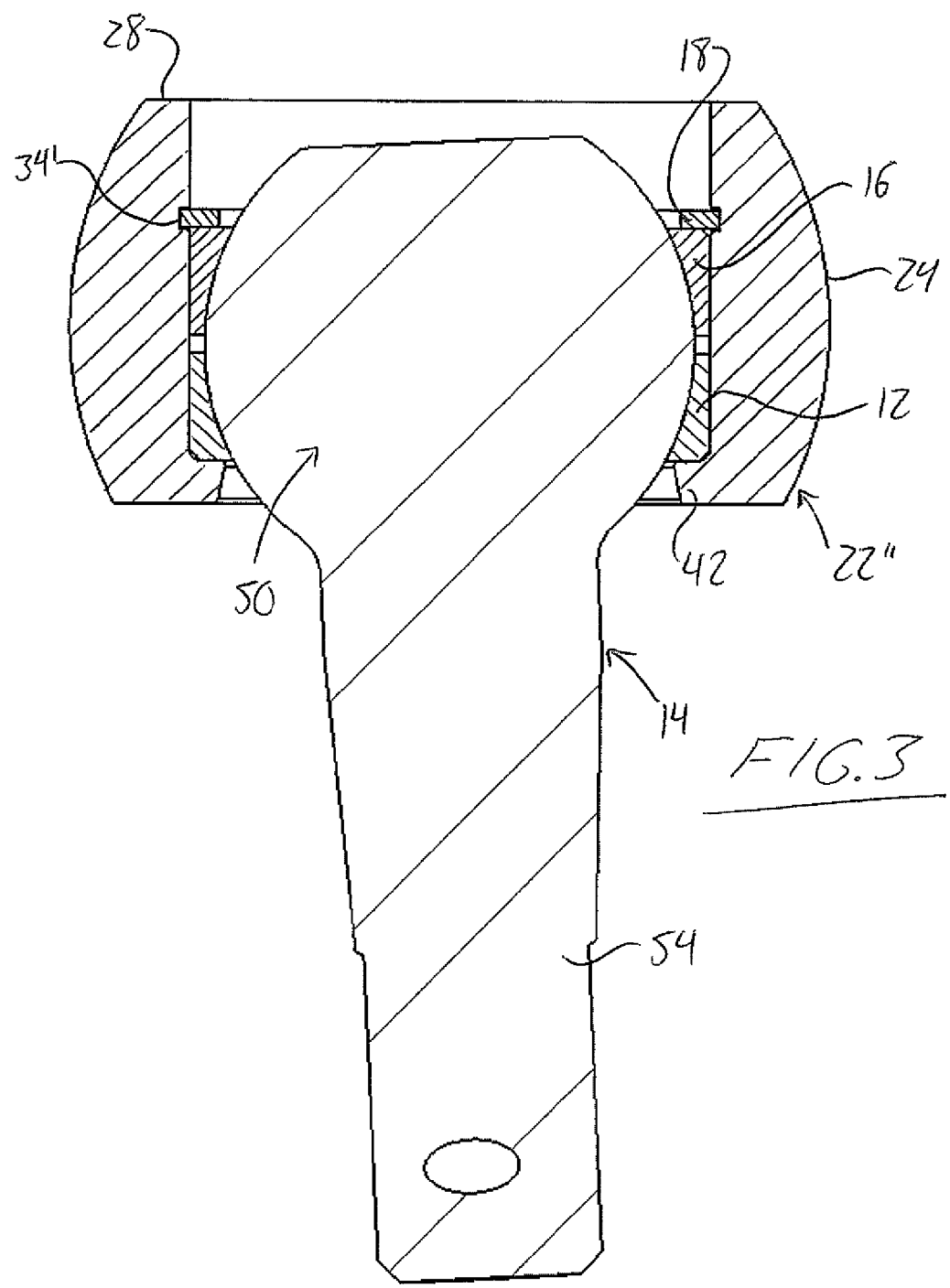
FIG. 3 is an assembled cross-sectional view of a tie rod end or rod end according to another embodiment of the present invention.
Figure 4:
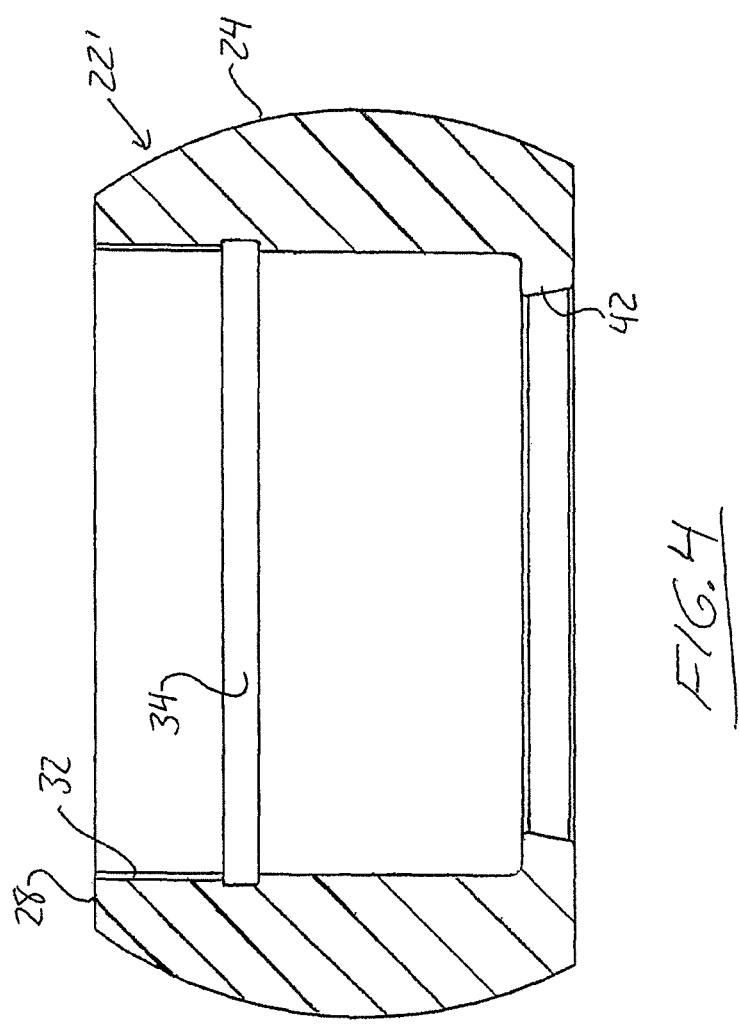

Another embodiment of the present invention is shown in FIG. 3. This embodiment differs from those described above in that is has no threaded retainer, and thus no internal threading on the housing body 22″, and also in that the annular groove 34′ in the housing wall is of a thickness that more closely conforms to that of the retaining ring. The embodiment is similar to the others in that the retaining ring 18 is the component that stops upward displacement of the installed races, as the retaining is placed directly adjacent the upper race in the series of internal components stacked together along the housing axis so that the underside of the ring is exposed to direct contact by the top end of the upper race 16. In other words, in each embodiment, no other component is present between the retaining ring and the upper race, distinguishing the arrangement from the aforementioned prior art use of rings installed overtop of a threaded retainer member abutting the upper race. In the embodiment of FIG. 3, with no threaded retaining member present to tighten the retaining ring against the upper race, the bottom of the groove can thus be situated flush with the top end of the upper race, as no initially unoccupied lower portion of the groove is required to later accommodate tightening of the ring against the upper race after wearing of the races or ball member, as there is not threaded member for performing such tightening.

The use of a snap ring or spiral lock ring as the sole race-retaining feature in the embodiment of FIG. 3 presents the advantage that the ring will not back off from its installed position, which as mentioned above may occur in other products where a threaded member is the sole retainer, while also presenting the advantage of simplified structure and assembly compared to the prior art solution of installing rings over a threaded retaining member to prevent the threaded member from rotating and backing off from it position against the upper race.

In the embodiment of FIG. 3, the races, or at least the upper race 16′, is made of 4140 alloy steel, preferably 4140 HTSR, or other metal of comparable hardness, thus providing a race of significantly greater hardness and rigid-shape compared to conventional spherical joint constructions employing relatively soft, deformable races of brass, nylon, Delrin™ or Teflon™. With this use of a notably harder race material, a snap ring or spiral ring alone is sufficient to hold the upper race in place, whereas the more deformable prior art race materials would be expected to eventually deform enough to pop out from under such a ring if no steel washer, threaded cap or other additional retainer feature were present to cooperate with the snap ring or spiral lock ring to hold the race in place.

Previously, use of 4140 HTSR alloy steel for races was believed to be unsuitable, as such material is often employed for the ball member, and the same-material contact between the races and the ball can lead to galling. However, applicant has found that use of 4140 HTSR alloy steel for both the races and the ball can be employed without galling complications by using a surface hardening treatment process on the ball to increase the surface hardness thereof. For example, using a salt bath nitriding process, the surface hardness of a 4140 HTSR ball member can be increased from about 20 Rockwell to 60 Rockwell, making the surface properties of the ball dissimilar enough from the untreated 4140 races to prevent galling between the ball and the races. The races may be treated with other processes, for example a zinc surface coating process to provide improved corrosion resistance, which may also be employed on the ring. For significant durability, the housing may also be produced from a body of the same material as the ball and races.

With lower hardness of the two, the races will tend to wear away quicker than the ball, which is preferable in the illustrated embodiment where the races are notably smaller in material volume than the ball member, and thus cheaper to produce and more affordable for the end-user of the joint to replace. However, it will be appreciated that other embodiments may employ surface-hardened races and an untreated ball member to achieve the similar material dissimilarities to avoid galling while alloying the use of harder race materials than the prior art in order to minimize failure risk when using a snap ring or spiral lock ring alone as the sole retaining feature for keeping the upper race in place within the housing.

It will be appreciated that the embodiments of FIGS. 1 and 2 may also employ this configuration ball and race members of the same material, but difference surfaces hardness, to provide long lasting, durable, steel components that provide high load capability and long term performance without galling complications. However, it will also be appreciated that the use of the threaded retainer member in cooperation with the retaining ring in the first embodiment may also mean that softer, more conventional race materials may alternatively be employed while still providing suitable performance characteristics and failure resistance.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A spherical automotive joint comprising:
   a housing comprising a housing body having a hollow interior extending thereinto along a housing axis from an open, internally threaded, upper end of said housing body toward an opposing lower end of said housing body;
   an externally threaded retaining member arranged to threadingly engage the internal threading at the upper end of the housing body;
   a ball member sized to fit within the hollow interior of the housing body and defining a spherically contoured concave outer surface extending around a ball axis of said ball member;
   a lower race sized to seat within the hollow interior of the housing body adjacent the lower end thereof and having a spherically contoured upward facing concave surface for conforming receipt of the concave outer periphery of the ball member therein to seat the ball member atop the lower race in a manner allowing tilting of the ball axis and rotation of the ball member thereabout;
   a steel upper race sized to fit within the hollow interior of the housing body over the ball member and having a spherically contoured downward facing concave surface for surmounting the ball member when tiltably and rotatably seated on the lower race;
   an annular groove in a peripheral wall of the hollow interior of the housing body at a position that is adjacent to an upper portion of the upper race when said upper race is surmounted on the ball member, an inner diameter of the housing being greater at said annular groove than at the internal threading of the open upper end of the housing; and
   a retaining ring engaged in the annular groove around the boundary wall of the hollow interior of the housing body in a position residing between upper and lower walls of the annular groove and exposed to direct contact with both the upper portion of the upper race and the upper wall of the annular groove, which is located between the retaining ring and the open, internally threaded, upper end of the housing and blocks movement of the retaining ring toward the open, internally threaded, upper end of the housing;
   wherein the interior space of the housing is free of any other components between the annular groove and the internally threaded upper end of the housing such that the retaining member, the retaining ring and the annular groove alone define an only mechanism of the spherical automotive joint for blocking movement of the upper race toward and through the open, internally threaded, upper end of the housing.

2. The spherical joint of claim 1 wherein the housing body comprises an integrally defined lower seat arranged for seating of the lower race thereagainst after insertion of the lower race into the hollow interior of the housing body through the upper end thereof.

3. The spherical joint of claim 2 wherein the lower seat is an annular seat closing around a bottom opening of the hollow interior of the housing body at the lower end thereof.

4. The spherical joint of claim 1 wherein the retaining ring is a snap ring.

5. The spherical joint of claim 1 wherein the retaining ring is a spiral lock ring.

6. The spherical joint of claim 1 wherein the upper race and the ball member is a steel ball member, comprise bodies of a same material.

7. The spherical joint of claim 6 wherein the steel upper race and the steel ball member have different surface hardness properties.

8. The spherical joint of claim 7 wherein the steel ball member has a greater surface hardness than the steel upper race.

9. The spherical joint of claim 7 wherein the steel upper race and the steel ball member comprise a same steel material.

10. The spherical joint of claim 9 wherein the steel upper race and the steel ball member are alloy steel.

11. The spherical joint of claim 10 wherein the alloy steel is 4140 steel.

12. A method of forming a spherical automotive joint, the method comprising:
    obtaining a housing body having a hollow interior extending thereinto along a housing axis from an open, internally threaded, upper end of said housing body toward an opposing lower end of said housing body, and an annular groove found in a boundary wall of the hollow interior of the housing body at a location between the upper and lower ends of the housing body;
    seating a lower race within the hollow interior of the housing body adjacent the lower end thereof;
    placing a ball member atop the lower race in a manner allowing tilting of the ball axis and rotation of the ball member thereabout;
    placing a steel upper race atop the ball member;
    engaging a retaining ring in the annular groove found around the boundary wall of the hollow interior of the housing body to place the retaining ring directly adjacent an upper portion of the upper race in a position residing between upper and lower walls of the annular groove and exposed to direct contact with both the upper portion of the upper race and the upper wall of the annular groove, which is located between the retaining ring and the open, internally threaded, upper end of the housing and blocks movement of the retaining ring toward the open, internally threaded, upper end of the housing, and an inner diameter of the housing being greater at said annular groove than at the internal threading of the open upper end of the housing;
    threadingly engaging an externally threaded retaining member in the internal threading at the upper end of the housing body; and
    leaving the hollow interior of the housing free of any other components between the annular groove and the open, internally threaded, upper end of the housing such that the retaining member, the retaining ring and the annular groove alone define an only mechanism of the spherical automotive joint for blocking movement of the upper race toward and through the open, internally threaded, upper end of the housing.

13. The method of claim 12 wherein the upper race and the ball member comprise bodies of a same steel material, and the method includes, before placing the ball member and the upper race in the hollow interior of the housing body, surface treating only one of said ball member and said upper race to impart a different surface hardness to said one of said ball member and said upper race relative to the other of said ball member and said upper race.

14. A spherical automotive joint comprising:
- a housing comprising a housing body having a hollow interior extending thereinto along a housing axis from an open, internally threaded, upper end of said housing body toward an opposing lower end of said housing body;
- an externally threaded retaining member arranged to threadingly engage the internal threading at the upper end of the housing body;
- a steel ball member sized to fit within the hollow interior of the housing body and defining a spherically contoured concave outer surface extending around a ball axis of said ball member;
- a lower race sized to seat within the hollow interior of the housing body adjacent the lower end thereof and having a spherically contoured upward facing concave surface for conforming receipt of the concave outer periphery of the ball member therein to seat the ball member atop the lower race in a manner allowing tilting of the ball axis and rotation of the ball member thereabout;
- a steel upper race sized to fit within the hollow interior of the housing body over the ball member and having a spherically contoured downward facing concave surface for surmounting the ball member when tiltably and rotatably seated on the lower race;
- an annular groove in a peripheral wall of the hollow interior of the housing body at a position that is adjacent to an upper portion of the upper race when said upper race is surmounted on the ball member, an inner diameter of the housing being greater at said annular groove than at the internal threading of the open upper end of the housing; and
- a retaining ring engaged in the annular groove around the boundary wall of the hollow interior of the housing body in a position residing between upper and lower walls of the annular groove and exposed to direct contact with both the upper portion of the upper race and the upper wall of the annular groove, which is located between the retaining ring and the open, internally threaded, upper end of the housing and blocks movement of the retaining ring toward the open, internally threaded, upper end of the housing;
- wherein the interior space of the housing is free of any other components between the annular groove and the internally threaded upper end of the housing such that the retaining member, the retaining ring and the annular groove alone define an only mechanism of the spherical automotive joint for blocking movement of the upper race toward and through the open, internally threaded, upper end of the housing; and
- wherein the steel ball and steel upper race comprise a same alloy steel, and one of the steel ball and the steel upper race has a greater surface hardness than the other of said steel ball and the steel upper race.

* * * * *